Patented June 1, 1954

2,680,077

UNITED STATES PATENT OFFICE 2,680,077

FLAMEPROOFING COMPOSITION OF NITROGEN-PHOSPHORUS COMPOUND IN COMBINATION WITH ORGANIC COMPOUND HAVING FREE HYDROXY RADICALS

Morris L. Nielsen and Russell W. Arnold, Dayton, Ohio, assignors to Monsanto Chemical Company, St. Louis, Mo., a corporation of Delaware No Drawing. Application December 30, 1949, Serial No. 136,136

6 Claims. (Cl. 106—15)

This invention is directed to fire-resistant compositions having utility as surface coatings and in various manufactured articles which are to be protected against fire and propagation of flames. It is an object of the invention to provide organic compositions based upon the combination of a phosphorus compound together with a resinous material characterized by the presence of active or unesterified hydroxy radicals. Such compositions may be utilized to treat base materials which would otherwise burn very easily, but which, by means of the improvement of the present invention, are able to resist the propagation of a flame. It is another object of the invention to provide resinous or plastic products for various purposes in which a substantially flameproof material is desired. A further object is the preparation of coating compositions utilizing resinous materials possessing active hydroxy radicals to adapt such resinous materials to treatment for the purpose of rendering the improved coating composition resistant to flame propagation.

Many attempts have been made in the past to provide fireproof coating compositions, resins and plastics, but so far as is known, no plastics of the type characterized by the presence of free hydroxy radicals in a non-aromatic or linear configuration have previously been made which were successful as a permanent flameproof or fire-retarding substance. Compositions which have previously been tested have shown only short-time protection in resisting burning and have generally shown poor stability and weathering qualities.

Resins of the phenol-formaldehyde type are known to resist fire fairly well compared to other resinous materials, but such plastic masses based upon chemicals having an aromatic radical present in the molecular configuration of the polymerized product are not contemplated in the designation of resinous materials having free hydroxy radicals. Such resins based upon aromatic or phenolic hydroxy radicals do not enter into a reaction with phosphorus compounds, such as is contemplated in the present invention. Resinous materials based upon nitrogen-containing compounds are also differentiated from the present improvement, inasmuch as the flameproofing composition described herein comprises the combination of polyphosphorylamide with linear or straight chain hydrocarbon compounds having free hydroxy groups in contrast to nitrogen-containing compounds.

Ammonium phosphate in various forms has been utilized in various fire-retardant compositions, but this material has the disadvantage of retaining its crystalline qualities so that coating compositions or plastic materials utilizing the same have been characterized by a rough, grainy finish. In addition, the water-solubility of the ammonium phosphates have rendered such compositions undesirable, since the property of resisting fire is greatly reduced or completely eliminated, because the ammonium phosphates wash out or weather away from the composition, leaving only organic materials which burn freely.

It has now been found that fire-retarding compositions of great stability may be provided by the combination of a compound having free hydroxy groups together with certain chemical compounds containing nitrogen and phosphorus. The nitrogen-phosphorus-containing component may be a polymeric, water-insoluble condensation product of ammonia and phosphoryl chloride. One type of such compounds is described by Mellor in Comprehensive Treatise on Inorganic and Theoretical Chemistry, 8, 713, Longmans, Green and Company, New York, 1928.

A preferred compound obtainable from the reaction product of anhydrous ammonia and phosphoryl chloride by heat-treatment thereof is the insoluble, infusible composition which has been designated as polyphosphorylamide. The preparation of the water-insoluble polyphosphorylamide is described in copending application, Serial Number 68,402, filed December 30, 1948, which application is assigned to the same assignee as is the present application. The polyphosphorylamide is a white powder, insoluble in water, and having a substantially neutral or alkaline reaction. The nitrogen-phosphorus atomic ratio of the polymeric material lies in the range of 1.72:1 to 1.80:1, which relatively high range represents a product desirable in providing a composition which, in the presence of nitrogen-containing resins such as aminoplasts, bulks up by releasing nitrogen compounds as gases when exposed to fire.

The process is most conveniently carried out by passing gaseous ammonia into a solution of phosphorus oxychloride (also called phosphoryl chloride) dissolved in a hydrocarbon solvent boiling above 200° C. until at least 5 moles of ammonia per mole of phosphorus oxychloride have been added and combined therewith. It has been found that a definite compound is formed at this stage, although more ammonia may be added. The reaction is best carried out at temperatures below 100° C. and preferably above 20° C., utilizing normal pressure or elevated pressure. Since exothermic reaction heat is liberated it is desirable to cool the hydrocarbon solution during the reaction in order to maintain the temperature thereof between the above limits. The product formed by this initial reaction is a fine, white powder which consists of a mixture of a nitrogen-phosphorus containing body and ammonium chloride. The nitrogen-phosphorus containing body is at this stage water-soluble and alkaline in reaction. If desired, the reaction product may now be separated by filtration or by centrifuging from the hydrocarbon and the separated product treated according to the second step of our process.

Preferably the heating step may be carried out upon the reaction product produced by the first step while the product is still suspended or mixed with the original hydrocarbon solvent. This results in better yields and simplified operation, since the material may be handled more easily and without losses. The second step of our process involves heating the product produced in the first step to a temperature above 155° C., but below a temperature of 250° C., either at atmospheric or superatmospheric pressure. During the heating period, a small amount of ammonia is evolved which may be recovered and reused in the process. During the heating step the nitrogen-phosphorus product apparently undergoes a polymerization or molecular rearrangement, being converted thereby into a water-insoluble product of higher molecular weight.

Example A

One hundred parts of phosphoryl chloride was dissolved in 300 parts of kerosene of commercial grade. The kerosene had a boiling range of about 150° to 260° C. Anhydrous ammonia gas was then passed into the kerosene solution at a slow rate of addition, and simultaneously therewith, the solution was cooled in order to maintain the temperature below about 80° C. At the same time, efficient agitation of the solution was maintained. The addition of ammonia was continued in this manner until 5 moles of ammonia had been reacted with the phosphoryl chloride. The reaction product was insoluble in kerosene and appeared as a white powder suspended therein.

After completion of the ammonia addition, the reaction mixture, while remaining suspended in kerosene, was heated to a temperature of 200° C. After the temperature had reached 200° C., heating was discontinued and the mixture permitted to cool. During the heating period, some ammonia was evolved, the nitrogen-phosphorus product apparently undergoing polymerization and becoming water-insoluble. At the end of the heating period, which may be carried out for a period of from one-fourth to three hours, preferably one to three hours, the solids were removed from the kerosene by filtration or centrifuging. The product was next washed with water in sufficient amount so as to dissolve the ammonium chloride present in the product. The washing operation may also be followed by a heating step which is designed to dry the product and also to remove traces of the kerosene or other hydrocarbon. A convenient method for removing the hydrocarbon consists in steaming the product while it is contained in a rotating centrifuge.

The nitrogen-phosphorus containing product, resulting from the present process, is substantially insoluble in water as well as organic solvents. It may be suspended or dispersed in water and will then exhibit a pH which is substantially neutral or alkaline in reaction. The final product is free from chlorine as a result of the heating and polymerization step, which makes it possible for the ammonium chloride to be completely removed to leave only the condensation product consisting essentially of nitrogen, oxygen, hydrogen and phosphorus.

Polyphosphorylamide per se is infusible except when exposed to a very great heat. It has been found that at high temperature, such as that resulting from the application of a flame, the polyphosphorylamide present in the combination resinous composition of the invention reacts chemically with a resin having free hydroxy groups to generate a non-burning gas which permeates and swells the coating film to form a porous, insulating layer. This action, which is termed intumescence, forms an adherent, fluffy char which does not burn. Consequently, the combustible resin, whether existing as a manufactured article or as a coating composition, does not itself burn, since it is protected by the heat-insulating, fire-retarding overlayer.

It has been found that the combination of the product obtained by the reaction of $POCl_3$ and ammonia, as described by Mellor, with certain aliphatic hydroxy containing compounds, and also condensation products or resins characterized by the presence of active hydroxy radicals, herein more particularly described, will, when exposed to fire, exhibit the property of intumescing or frothing during thermal decomposition in such a manner that a porous, crusty, solid film or residue is produced. Such porous, crusty film or residue is sufficiently continuous and adherent so that combustible material coated therewith is effectively protected against access of air with the result that combustion thereof is greatly diminished and in many cases, completely suppressed. Moreover, the frothy or porous nature of the film or crust considerably retards the transmission of heat into the combustible material, upon which it is supported or coated, so that distillation of combustible gaseous products is materially diminished, resulting in many cases in the ultimate extinction of fire.

The nitrogen-phosphorus-containing product, which is one component of the preferred composition, is obtained by the reaction of $POCl_3$ and ammonia, as described in the above reference to Mellor. It is therein termed diamido diphosphoric acid. However, it may be of somewhat variable composition, depending upon the proportions of the reacting ingredients employed in producing it. Ammonium chloride is uniformly a by-product in the reaction between $POCl_3$ and ammonia, generally corresponding in amount to all of the chlorine present in the $POCl_3$. Such by-product ammonium chloride may be permitted to remain in the ultimate composition or it may be removed, which is generally done by leaching with water, as is described by Mellor.

The product obtained when $POCl_3$ and ammonia are reacted together in the manner described by Mellor generally possesses acidic properties and for many purposes is undesirable for this reason. We, therefore, prefer to use the product made according to the pending application of John E. Malowan and Forrest R. Hurley, entitled "Composition of Matter and Process for Same," Serial No. 68,402, filed December 30, 1948, which application is assigned to the same assignee as is the present case. According to the said Malowan and Hurley invention, the reaction between POCl₃ and ammonia is preferably carried out in an organic solvent which has a normal boiling point in excess of 200° C., after which the product, while still suspended in the organic solvent, is subjected to a temperature above 155° C. for a period of time so that the water-soluble condensation product initially formed is rendered water-insoluble. At the same time, it has been found that the acidic reaction possessed by the prior art products has been, by the Malowan-Hurley process, considerably diminished, the final product possessing a neutral to slightly alkaline reaction. For application to combustible materials which are normally acid-sensitive, the Malowan-Hurley product is accordingly preferred. However, for those combustible products where the acidity of the coating composition is not important, we may use the POCl₃-ammonia reaction products produced according to the prior art processes mentioned above.

The particular materials which supply active hydroxy radicals to the combination of the present invention may in their simplest form consist of carbohydrates, such as sucrose, glucose, sorbitol, mannitol and other polyhydroxy compounds, such as pentaerythritol. Pentaerythritol may also be employed in the dimeric and trimeric forms. It is preferable, however, that such active hydroxy radicals be furnished by materials characterized by more pronounced resinous properties, such as the alkyd resins which are described in Chemistry of Commercial Plastics by R. L. Wakeman, Chapter 11, pages 216–256 (1947). Such alkyd compounds as result from the reaction of phthalic anhydride and glycerol may also be modified by the introduction into the linear polymeric radical of modifying constituents, such as linoleic acid. Other resinous materials which are contemplated are reaction products based upon maleic anhydride, such as with hydroxy compounds such as glycerol or pentaerythritol, and also compositions such as maleic anhydride, diglycol and styrene, which latter material is commercially available as a resin designated as the "Thalid" type.

The fireproofing composition is prepared merely by mixing together the POCl₃-ammonia reaction product and the active hydroxy radical-containing resin. A mixture may be made of any of these ingredients in the dry state, or the mixture may be produced in aqueous solution or dispersion, or it may be produced in solution or dispersion in any suitable organic solvent or vehicle.

The proportions may also be varied over a wide range depending upon the degree of fire-retarding effect desired. It has been found, however, that the essential composition consisting of POCl₃-ammonia reaction product and the organic or resinous material furnishing the active hydroxy radicals should contain at least 10 parts and preferably not more than 90 parts by weight of said POCl₃-ammonia condensation product per 100 parts by weight of the final mixture.

A preferred embodiment of the present invention is provided by utilizing, in conjunction with the hydroxy component, the polyphosphorylamide or other reaction products of phosphoryl chloride and ammonia, as described by Mellor, supra, in the concentration range of 10% to 50% by weight of the dry components. High proportions of the phosphorus compound may be employed since this substance also acts as a pigmenting agent, which is particularly advantageous in making white and other light-colored coatings and manufactured articles.

In accordance with the invention, it is contemplated that the products may be applied to the surface of wood or other combustible materials, or non-combustible materials, to provide a film or layer of the hydroxy resin in combination with the phosphorus compound to give a coating which is adherent and stable. When this material is subjected to heat, a chemical reaction occurs between the phosphorus compound and the resin to release gases which intumesce or puff up the decomposition products to provide a porous, adherent, solid froth or char, which is an excellent heat-insulator, and thereby protects the base material or treated surface.

Organic binders, such as chlorinated rubber, chlorinated paraffin, and alkyd resins or polyvinyl chloride, are also optional ingredients in the coating composition or manufactured article, based upon the present plastic materials. The utilization of these binders aids in the application of the material when in a liquid or paste form.

Illustrative of the combination of the organic component or resin, together with the reaction product of phosphoryl chloride and ammonia, the following examples show certain embodiments of the invention without, however, being limitative of the scope of the invention:

*Example 1*

An alkyd resin resulting from the reaction of phthalic anhydride and glycerol and commercially available under the designation of Glyptal was mixed with 10% by weight based upon the resin of polyphosphorylamide. The product which was obtained as a granular mixture could be applied by dispersion in acetone to leave a rough film upon a base material, such as a wooden surface. The treated material thus obtained upon exposure to a flame resisted combustion and also showed no tendency to glow after removal of the flame. The material was tested according to the standard fire test described in the American Paint Journal Convention Daily, pages 8–30, November 6, 1946, which test was modified by the substitution of a gas micro burner for the alcohol cup. The combination product described above showed vigorous intumescing action when subjected to fire. Under these circumstances, the intumescent material puffed up and released gases to form a porous, heat-insulating char which protected the base material from the fire.

In general, the proportion of polyphosphorylamide or other reaction products of phosphoryl chloride and ammonia may be utilized in intumescing compositions in a concentration range of 10% to 50% by weight, based upon the weight of the resin employed in the composition.

*Example 2*

A formulation was prepared of 100 parts of mannitol and 100 parts of polyphosphorylamide, the water-insoluble, high-molecular-weight polymeric product of anhydrous ammonia phosphoryl chloride. This combination was tested as a film, and was found to intumesce to give a protective char having desirable, frothy, heat-insulating characteristics. It was found that the polyphosphorylamide could be employed over a wide range of proportions, although a preferred range was from 10% to 50% of this component relative to the mixture with the hydroxy radical component, e. g., the mannitol.

Example 3

Pentaerythritol, 1000 parts was employed with 2500 parts of polyphosphorylamide in a slurry utilizing 3400 parts of water. It was found that the dried film, when subjected to a flame, bulked up to give an excellent intumescing layer.

Example 4

A composition of 30 parts of phosphorylamide with 10 parts of technical grade pentaerythritol was slurried in alcohol. This mixture, when applied to test panels, gave films possessing fair durability, and characterized by large volume intumescence when subjected to a flame. It was found that the proportion of polyphosphorylamide could be varied over a wide range while maintaining the intumescing effect, although a preferred range was from 10% to 50% of this component relative to the mixture with the component supplying the active hydroxy radicals.

Example 5

A mixture was made of 300 parts of sorbitol and 100 parts of polyphosphorylamide. This was slurried in a light hydrocarbon distillate, and was then applied as a film on a wood panel. The panel was dried and was then subjected to a test flame. It was found that the film bulked up during the heating, so that the otherwise combustible base did not burn.

The compositions of the invention may be made in the form of a solid in massive form or granulated, and may also be utilized as paste or liquid resin in which the polyphosphorylamide is dispersed. Pigments, dyes, or other coloring materials may also be added if desired. The compositions of the present invention may be utilized in the manufacture of various articles of manufacture or may be applied to wood, paper fabric, leather, rubber and other combustible materials. However, the compositions are also suitable for application to copper, brass and other metals without danger of corrosion. A particularly important application of the compositions of the present invention is to provide a fire-retarding coating composition upon steel. In such applications, the materials applied as a surface coating are free from the danger of flashing, which is characteristic of most organic coating compositions. In addition, such treated surfaces, when subjected to a high temperature will not propagate a flame, but, instead, will intumesce or swell to provide a heat-insulating, fire-retarding composition. Such treated steel surfaces retain their strength during attack by fire, thereby preventing buckling. The resinous compositions of the invention, when employed as a coating composition, may be applied in any convenient manner, such as by spraying, brushing, and dipping.

This application contains subject matter in common with certain other applications assigned to the same assignee as is the present application:

Serial No. 68,402, filed December 30, 1948, relating to the water-insoluble composition of matter resulting from the reaction of phosphoryl chloride and ammonia;

Serial No. 68,403, filed December 30, 1948, relating to a water paint comprising the above reaction product of phosphoryl chloride and ammonia in combination with water-soluble, nitrogen-containing resinous materials;

Serial No. 68,404, filed December 30, 1948, relating to a flameproofing treatment for cotton by the application thereto of the reaction product of phosphoryl oxychloride and ammonia;

Serial No. 68,405, filed December 30, 1948, relating to compositions comprising phenol-formaldehyde resins in combination with the reaction product of phosphoryl chloride and ammonia;

Serial No. 68,406, filed December 30, 1948, relating to intumescing compositions comprising the combination of a nitrogen-containing resin in combination with the reaction product of phosphoryl chloride and ammonia;

Serial No. 68,407, filed December 30, 1948, relating to water paints based upon the combination of the reaction product of phosphoryl chloride and ammonia together with water-soluble alkyd resins derived from the reaction of citric acid and glycerine;

Serial No. 68,408, filed December 30, 1948, relating to water emulsion paints comprising the combination of a nitrogen-containing resin and the reaction product of phophoryl chloride and ammonia together with polyhydroxy compounds such as pentaerythritol;

Serial No. 68,409, filed December 30, 1948, relating to a coating composition comprising an organic solvent containing organic, film-forming resins in combination with the reaction product of phosphoryl chloride and ammonia;

Serial No. 68,410, filed December 30, 1948, relating to the combination of the reaction product of phosphoryl chloride and ammonia together with chlorinated rubber;

Serial No. 68,411, filed December 30, 1948, relating to flameproofed cloth having deposited thereon the combination of the reaction product of phosphoryl chloride and ammonia together with antimony oxide and polyvinyl chloride;

Serial No. 136,135, filed December 30, 1949, relating to glowproofing compositions comprising the combination of the reaction product of phosphoryl chloride and ammonia together with antimony oxide and chlorinated paraffins.

Of the above applications, the following have been issued as patents: Serial No. 68,402, now Patent No. 2,596,935; Serial No. 68,403, now Patent No. 2,642,405; Serial No. 68,405, now Patent No. 2,596,936; Serial No. 68,406, now Patent No. 2,596,937; Serial No. 68,407, now Patent No. 2,596,938; Serial No. 68,408, now Patent No. 2,596,939; Serial No. 68,410, now Patent No. 2,596,496.

Having now described certain specific forms of the invention, it is to be understood that the invention is not to be limited to the specific forms of the compositions herein-described or specifically covered by the claims.

What is claimed and is desired to be protected by Letters Patent of the United States is:

1. An intumescing fire-retarding composition composed of the water-insoluble reaction product of phosphoryl chloride and anhydrous ammonia, said water-insoluble product having a nitrogen/phosphorus ratio between 1.72:1 and 1.80:1, in combination with an alkyd resin having free hydroxy radicals.

2. An intumescing fire-retarding composition composed of the water-insoluble reaction product of phosphoryl chloride and anhydrous ammonia, said water-insoluble product having a nitrogen/phosphorus ratio between 1.72:1 and 1.80:1, in combination with a resinous product having free hydroxy radicals and resulting from the reaction of a polybasic acid component with a polyhydric alcohol compound.

3. An intumescing fire-retarding composition composed of the water-insoluble reaction product of phosphoryl chloride and anhydrous ammonia, said water-insoluble product having a nitrogen/phosphorus ratio between 1.72:1 and 1.80:1, in combination with a polyhydric alcohol having free hydroxy radicals.

4. An intumescing fire-retarding composition composed of the water-insoluble reaction product of phosphoryl chloride and anhydrous ammonia, said water-insoluble product having a nitrogen/phosphorus ratio between 1.72:1 and 1.80:1, in combination with pentaerythritol.

5. An intumescing fire-retarding composition composed of the water-insoluble reaction product of phosphoryl chloride and anhydrous ammonia, said water-insoluble product having a nitrogen/phosphorus ratio between 1.72:1 and 1.80:1, in combination with mannitol.

6. An intumescing fire-retarding composition composed of the water-insoluble reaction product of phosphoryl chloride and anhydrous ammonia, said water-insoluble product having a nitrogen/phosphorus ratio between 1.72:1 and 1.80:1, in combination with sorbitol.

References Cited in the file of this patent

UNITED STATES PATENTS

| Number | Name | Date |
| --- | --- | --- |
| 2,163,085 | Cupery | June 20, 1930 |
| 2,596,937 | Nielsen | May 13, 1952 |
| 2,596,938 | Nielsen et al. | May 13, 1952 |
| 2,596,939 | Nielsen et al. | May 13, 1952 |